US007962102B2

(12) United States Patent (10) Patent No.: US 7,962,102 B2
Corral et al. (45) Date of Patent: Jun. 14, 2011

(54) METHOD AND SYSTEM FOR ADAPTIVE RAY LAUNCHING

(75) Inventors: Celestino A. Corral, Lake Worth, FL (US); Shahriar Emami, Hillsboro, OR (US); Salvador Sibecas, Lake Worth, FL (US); Glafkos Stratis, Lake Worth, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 889 days.

(21) Appl. No.: 11/749,054

(22) Filed: May 15, 2007

(65) Prior Publication Data

US 2008/0132174 A1 Jun. 5, 2008

Related U.S. Application Data

(60) Provisional application No. 60/868,068, filed on Nov. 30, 2006.

(51) Int. Cl.
*H04W 24/00* (2009.01)
(52) U.S. Cl. .................... 455/67.16; 455/67.11
(58) Field of Classification Search .................... None
See application file for complete search history.

(56) References Cited

U.S. PATENT DOCUMENTS

| 5,574,466 | A | * | 11/1996 | Reed et al. ................ 455/277.1 |
| 5,828,960 | A | | 10/1998 | Tang et al. |
| 5,831,874 | A | | 11/1998 | Boone et al. |
| 6,161,018 | A | | 12/2000 | Reed et al. |
| 6,487,417 | B1 | | 11/2002 | Rossoni et al. |
| 6,751,322 | B1 | | 6/2004 | Carlbom et al. |
| 2002/0094809 | A1 | | 7/2002 | Watanabe et al. |
| 2002/0107663 | A1 | | 8/2002 | Furukawa et al. |
| 2003/0220745 | A1 | | 11/2003 | Campbell |
| 2004/0259554 | A1 | * | 12/2004 | Rappaport et al. ........... 455/446 |
| 2005/0068545 | A1 | | 3/2005 | Niu et al. |
| 2005/0088165 | A1 | | 4/2005 | Watanabe et al. |
| 2007/0093212 | A1 | * | 4/2007 | Sugahara ................... 455/67.16 |
| 2009/0144037 | A1 | | 6/2009 | Sibecas et al. |

(Continued)

FOREIGN PATENT DOCUMENTS

KR 1020010011922 A 2/2001

(Continued)

OTHER PUBLICATIONS

Michael C. Lawton and J. P. McGeehan, The Application of a Deterministic Ray Launching Algorithm for the Prediction of Radio Channel Characteristics in Small-Cell Environments, IEEE Transactions on Vehicular Tech., Nov. 1994, pp. 955-969, vol. 43 No. 4.

(Continued)

*Primary Examiner* — Lewis G West
*Assistant Examiner* — Gennadiy Tsvey
(74) *Attorney, Agent, or Firm* — Pablo Meles; Sylvia Chen

(57) ABSTRACT

A system (170) and method (300) for ray launching is provided. The system can include a transmitter (110) for successively launching a plurality of rays, and a receiver (120) for receiving transmission rays and reflection rays. A controller (141) can be included for selectively adjusting an angular spacing and eliminating rays in successive launches to focus an energy on the receiver. A method (430) of terminating rays for reducing computational complexity is provided. A method (340) for ray weighting for increasing a computational speed of ray propagation is provided. In one aspect, a quality of service (108) can be determined at the receiver based on ray propagation.

18 Claims, 10 Drawing Sheets

U.S. PATENT DOCUMENTS

2009/0167756 A1     7/2009   Bijamov et al.

FOREIGN PATENT DOCUMENTS

WO          97/44977 A1     11/1997

OTHER PUBLICATIONS

Ulrich Dersch and Ernst Zollinger, Propagation Mechanisms in Microcell and Indoor Environments, IEEE Transactions on Vehicular Tech., Nov. 1994, pp. 1058-1066, vol. 43 No. 4.

Georgia E. Athanasiadou and Andrew R. Nix, A Novel 3-D Indoor Ray-Tracing Propagation Model: The Path Generator and Evaluation of Narrow-Band and Wide-Band Predictions, IEEE Transactions on Vehicular Tech., Jul. 2000, pp. 1152-1168, vol. 49 No. 4.

Zhijun Zhang et al., Ray Tracing Method for Propagation Models in Wireless Communication Systems, Electronics Letters, Mar. 2, 2000, pp. 464-465, vol. 36 No. 5.

Francisco Saez de Adana et al., Propagation Model Based on Ray Tracing for the Design of Personal Communication Systems in Indoor Environments, IEEE Transactions on Vehicular Tech., Nov. 2000, pp. 2105-2112, vol. 49 No. 6.

R. Hoppe et al., Wideband Propagation Modelling for Indoor Environments and for Radio Transmission into Buildings, The 11th IEEE Int'l Symp. on Personal, Indoor and Mobile Radio Communications (PIMRC), 2000, pp. 282-286, vol. 1.

V. Sampath et al., Comparison of Statistical and Deterministic Indoor Propagation Prediction Techniques with Field Measurements, IEEE 47th Vehicular Technology Conference, 1997, pp. 1138-1142, vol. 2.

William H. Press et al., Chapter 9: "Section 9.1 Bisection Method", Numerical Recipes in C: The Art of Scientific Computing, 1992, pp. 347-393, 2nd Edition, Cambridge University Press.

Saic, Urbana 3-D Wireless Toolkit, http://www.saic.com/products/software/urbana/, downloaded Aug. 4, 2010, 2 pages.

Takeshi Manabe et al., Effects of Antenna Directivity and Polarization on Indoor Multipath Propagation Characteristics at 60 GHz, IEEE J. on Selected Areas in Comm., Apr. 1996, pp. 441-448, vol. 14 No. 3.

Patent Cooperation Treaty, "PCT Search Report and Written Opinion of the International Searching Authority" for International Application No. PCT/US2007/082183, Mar. 31, 2008, 12 pages.

Magdy Iskander and Zhengqing Yun, "Propagation Prediction Models for Wireless Communication Systems," IEEE Transactions on Microwave Theory and Tech., Mar. 2002, pp. 662-672, vol. 50 No. 3.

Paul S. Heckbert and Pat Hanrahan, "Beam Tracing Polygonal Objects", Proc. on SIGGRAPH, Jul. 1984, pp. 119-127, vol. 18 No. 3.

Patent Cooperation Treaty, "PCT Search Report and Written Opinion of the International Searching Authority" for International Application No. PCT/US2008/083297, Apr. 27, 2009, 11 pages.

U.S. Patent and Trademark Office, "Non-Final Rejection" for U.S. Appl. No. 11/948,636, Jun. 28, 2010, 15 pages.

Seong-Cheol Kim, et al., "Radio Propagation Measurements and Prediction Using Three-Dimensional Ray Tracing in Urban Environments at 908 MHz and 1.9 GHz", IEEE Transactions on Vehicular Technology, May 1999, pp. 931-946, vol. 48 No. 3.

"Diffraction" From Wikipedia, the free encyclopedia, downloaded Aug. 2, 2010; http://en.wikipedia.org/wiki/Diffraction, 10 pages.

Bertoni, H.L. et al., "UHF Propagation Prediction for Wireless Personal Communications," in Proc. IEEE, vol. 82, pp. 1333-1359, Sep. 1994.

Kurner, T. et al., "Concepts and Results for 3D Digital Terrain-Based Wave Propagation Models: An Overview," IEEE J. Selected Areas Commun., vol. 11, pp. 1002-1012, Sep. 1993.

Lee et al., The Boost Graph Library: User Guide and Reference Manual, Addison-Wesley 2002; Section 21. Algorithms; Sub-Section 19. "astar_search"; 10 pages.

Li, M.M. et al., "A Three-Dimensional (3-D) Substrate-Guided-Wave to Free-Space Multistage Optoelectronic Interconnection Using Wavelength Division Multiplexing and Space Division Demultiplexing" IEEE Journal of Lightwave Technology, Mar. 1996.

Patent Cooperation Treaty, "PCT Search Report and Written Opinion of the International Searching Authority" for International Application No. PCT/US2008/086956 Dec. 16, 2008, 9 pages.

Liang, G. and Bertoni, H., "A New Approach to 3-D Ray Tracing for Propagation Prediction in Cities" IEEE Transactions on Antennas and Propagation, vol. 46, No. 6, pp. 853-863, Jun. 1998.

Escarieu, F. et al., "Outdoor and Indoor Channel Characterization by a 3D Simulation Software" IEEE International Symposium on Personal, Indoor and Mobile Communications (PIMRC) 2001, pp. 360-364, Sep. 2001.

Leubbers, Raymond J., "Propagation Prediction for Hilly Terrain Using GTD Wedge Diffraction" IEEE Transactions on Antennas and Propagation, vol. AP-32, No. 9, pp. 951-955, Sep. 1984.

\* cited by examiner

RAY PROPAGATION

RAY TRACING

RAY LAUNCHING

ASSYMETRIC BINARY TREE STRUCTURE

METHOD AND SYSTEM FOR ADAPTIVE RAY LAUNCHING

CROSS REFERENCE TO RELATED APPLICATIONS

This application claims the benefit of U.S. Provisional Patent Application No. 60/868,068, filed Nov. 30, 2006, the entire contents of which are incorporated by reference herein.

FIELD OF THE INVENTION

The present invention relates to software, and more particularly, to modeling signal energy propagation.

INTRODUCTION

The hand-held radio and mobile device industry is constantly challenged in the market place for high audio quality products which provide good reception and coverage. Good coverage and reception are generally a function of signal propagation and signal strength. Signal strength and propagation can be compromised in environments having reflective objects. Radio frequency signals transmitted in a cluttered environment can reflect off the objects causing interference. This can lower the signal strength or introduce distortion in the received signal thereby deteriorating reception quality. Moreover, due to reflections and initial directions, some of the propagating signals may never reach the mobile device. These signals may not contribute to the reception at the mobile device.

Radio frequency signal propagation in an adverse environment can be performed via simulation. In a simulation, reflective properties of the objects can be modeled in order to characterize the effects on signal propagation. Ray propagation is one method used for analyzing signal propagation. A ray can be defined as a straight line normal to the wave front in the propagation of radiant energy. Referring to FIG. 1, an illustration for ray propagation 100 is shown. A source 110 can transmit a ray 111 that can strike a target 120, either directly, or by reflection off an object or surface 115. A ray may directly strike a target, such as a mobile device, or reflect off objects in the environment before reaching the target. Reflected rays may have a lower signal strength due to the reflection.

Ray tracing is one prior art method used for modeling signal propagation. Ray tracing is based on tracing signal paths from an observation point 120 to a source 110. This is in contrast to other methods which start from the source 110 and determine the path to the observation point 120. Referring to FIG. 2, an illustration of ray tracing 160 is shown. Ray tracing 160 operates by tracing, in reverse, a path that could have been taken by a ray received at the observation point 120. Notably, the rays are traced from the target 120 to the source 110 for determining which rays have struck the target. Ray tracing 160 takes into account reflective objects, or surfaces, that contribute to the reception of signals at the observation point.

Ray tracing is a computationally expensive method for determining the number of rays that strike a target. In particular, ray tracing has some significant disadvantages. Ray tracing in three-dimensional environment can require complex databases having complex tracing structures that fail to converge. Ray tracing also typically requires an assumption of planar surfaces in the environment contributing to reflection. Ray tracing cannot also adequately account for rounded or cylindrical surfaces in the environment. A need therefore exists for a method of ray tracing that is computationally efficient and accurate for modeling environments.

SUMMARY

Broadly stated, embodiments of the invention are directed to a method and system for ray launching. Ray launching is a technique wherein a plurality rays are emitted at an initial angle. A path of the rays can then be traced until a certain termination condition is met. The termination condition can be a direct strike of the target or a direct strike of the target due to a given number of reflections. Ray launching is a continuing process wherein a first plurality of rays are launched followed by a second plurality of rays. The plurality of rays are successively reduced based on a success of a previous plurality of rays to focus a concentration of energy on a target. The initial angle of ray launching can be successively reduced to increase a resolution and a number of rays that strike a target. The number of rays launched for each succession depends on the success of previous rays striking a target, either directly or by reflection.

One embodiment is directed to a system for estimating signal propagation in a communication channel. The system can include a transmitter for successively launching a plurality of rays in an environment having reflection objects, and a receiver in the environment for receiving transmission rays from the transmitter and reflection rays from the reflection objects. The transmitter can eliminate successive rays that do not reach the receiver using successive angular spacing reduction. The transmitter can include a controller for determining an angular spacing for launching the plurality of rays, and selectively adjusting the angular spacing for successive launches to focus an energy of transmission rays and reflection rays on the receiver. The method can include eliminating pre-launch rays that have no tagged neighbors, and eliminating pre-launch rays that are less than a predetermined angle. The method can include tagging rays that successfully strike the observation region directly, via reflection, via transmission, or via combinations thereof, or via any set of pre-defined energy changing events.

Another embodiment is directed to a system for estimating energy propagation in a medium. The system can include a source for successively launching a plurality of rays in an environment having energy operation objects, and a sink in the environment for coupling the energy rays from the operations of the energy on the objects. The source can eliminate successive rays that do not reach the sink using successive angular spacing reduction.

Another embodiment is directed to a method for ray launching. The method can include launching a plurality of rays in the environment from a source, evaluating an incidence of transmission rays and reflection rays on an observation region, and selectively adjusting the launching in view of the incidence to focus an energy of the transmission rays and reflection rays on the observation region. The method can further include estimating a ray propagation from the source to the observation region, and determining a ray reception quality at the observation region from the signal propagation.

Another embodiment is directed to a method of tracking successful rays. The method can include creating a reflection binary tree consisting of transmission nodes and reflection nodes for determining whether a transmission is received or a reflection is received, and pruning nodes in the binary reflection tree that do not contribute to the incidence. The pruning can eliminate rays that do not generate a transmission or a reflection on the observation region Another embodiment is directed to improving the method or ray launching. The method can further include terminating a ray propagation if an incidence of the ray is below a threshold, terminating a ray propagation based on a number of reflections supported per ray, terminating a ray propagation based on a number of transmissions supported per ray, terminating a ray propagation based on a number of diffractions supported per ray, or terminating a ray based on a combination thereof. The method can include weighting a ray proportional to a number of reflections required to reach the observation region, weighting a ray proportional to a number of transmissions required to reach the observation region, weighting a ray proportional to a distance between reflections, weighting a ray proportional to a distance between transmissions, or weighting a ray based on a combination thereof.

Another embodiment is directed to a method for parallelizing ray launching. The method can include partitioning the source into distinct ray launching regions and assigning each region to a different processing engine. The method can also include partitioning the ray launch in terms of total number of rays to launch, wherein the partitioning is based on a total number of rays launched.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

Figure 1:
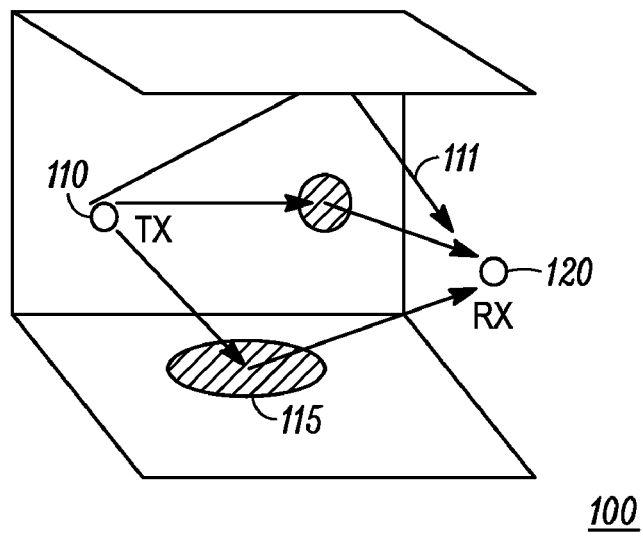
FIG. 1 is an illustration for ray propagation.
Figure 2:
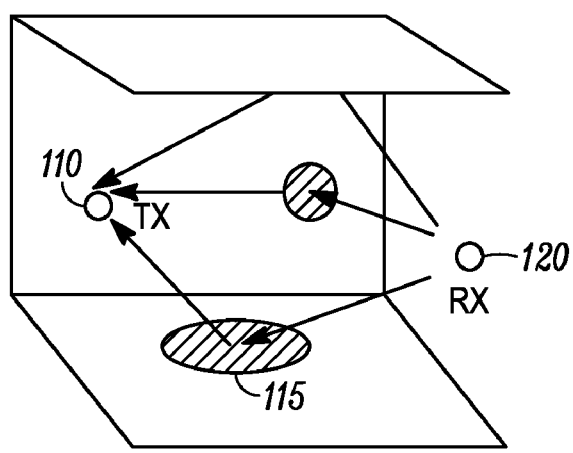
FIG. 2 is an illustration for ray tracing.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The term "ray tracing" can be defined as charting out a path of a ray from an observation region to a source. The term "trace" can be defined as charting out a path of a ray. The term "ray launching" can be defined as launching a plurality of rays at an initial angle, and selectively reducing the angle to focus rays on an observation region. The term "continuing propagation" can be defined as a ray that continues after reflection and/or transmission and/or diffraction. The term "ray termination" can be defined as terminating a calculation of a trace for a ray striking a target. The term "terminating ray propagation" can be defined as preventing a ray from being launched. The term "incident" can be defined as rays that strike a target. The term "successful ray" can be defined as a ray that reaches a target. The term "successive launch" can be defined as a launch that occurs sequentially. The term "subsequent launch" can be defined as a second launch occurring after a first launch. The term "reflection ray" can be defined as a reflection of energy due to a direct transmission on an object. A reflection ray can also include diffraction rays.

Figure 3:
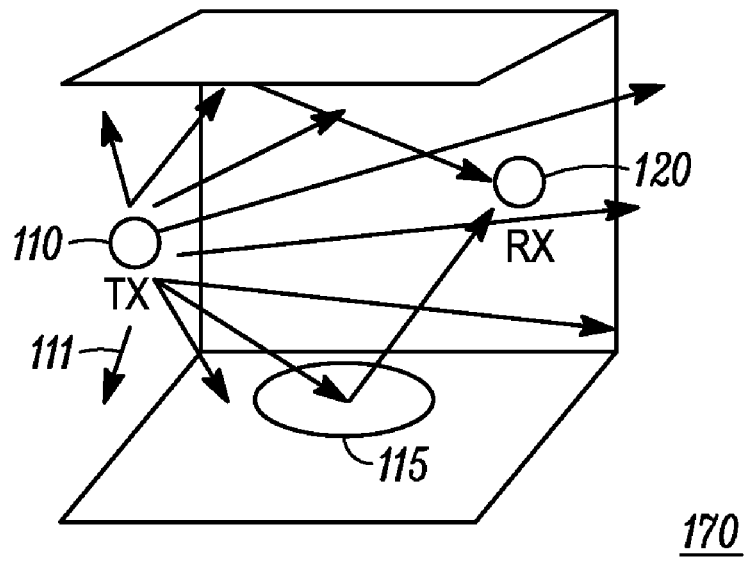
FIG. 3 is an illustration for ray launching in accordance with the embodiments of the invention.

Referring to FIG. 3, an illustration for ray launching 170 is shown. In ray launching 170, rays are initially emitted at various angles and their paths are traced until a certain termination condition is met. The termination condition can be assessed at the observation point or during ray propagation. A termination condition can be a failing of a ray to strike a target, a failing of a received energy level of the ray to meet a threshold, an exceeding a number of predetermined reflections prior to strike, or exceeding a number of transmissions supported per ray. The angles are successively reduced depending on the number of rays that reach the target. Rays that successfully reach the target are preserved, and new rays are spawned adjacent to the successful rays. Rays that do not reach the target are eliminated. A ray that is eliminated is no longer traced in subsequent ray launches. The tracing occurs from the source to the target. In ray launching 170, as shown, the source 110 can transmit multiple rays 111 at various angles in a multitude of directions. Some of the rays 111 will strike the target 120 via direct transmission or via reflection off an object or a surface 115.

Figure 4:
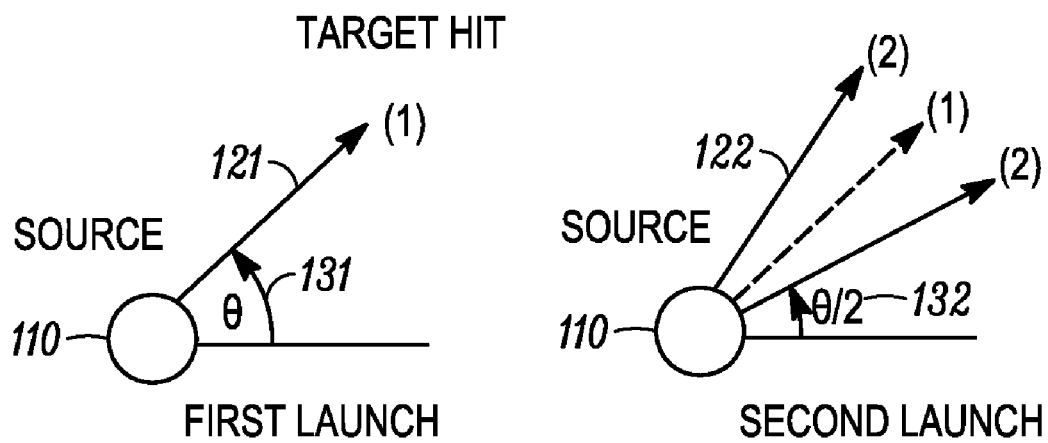
FIG. 4 is an illustration of adjusting a launching angle in accordance with the embodiments of the invention.

In ray launching 170, the angles of transmitted rays can be successively reduced depending on the number of rays 111 that successfully reach the target. This includes rays 111 that are incident on the target 120 either by direct transmission or reflection. In practice, referring to FIG. 4. at a first launch, a first ray 121 may strike the target 120. If the first ray 121 does not successfully strike the target 120, the first ray 121 is eliminated from successive launches. If the first ray 121 is successful in striking the target 120, the initial angle θ 131 is reduced to θ/2 132. In practice, the reduction can be any factor of the original angle and is not limited to a halving operation (i.e. divide by 2). In one aspect, a halving operation provides a fast binary search. After the halving, the first ray 121 is then accompanied by at least one adjacent ray 122. In one aspect, the first ray 121 can spawn a single ray. In another aspect, as shown, the first ray 121 has spawned two side rays as a result of the successful strike. At a second launch, the first ray 121 and the second ray(s) 122 can be emitted. Each ray can be evaluated for success. A ray that succeeds in striking a target can spawn new rays at new angles for successive launches. Each successive launch can reduce the angle of launch for successful rays to spawn at least one new ray. Rays that do not strike the target can be eliminated from successive launch. In such regard, ray launching is an adaptive process that focuses a concentration of energy on the target 120 based on the success of rays reaching a target. It is adaptive in the sense that it can use previous ray launch results to launch subsequent rays.

Figure 5:
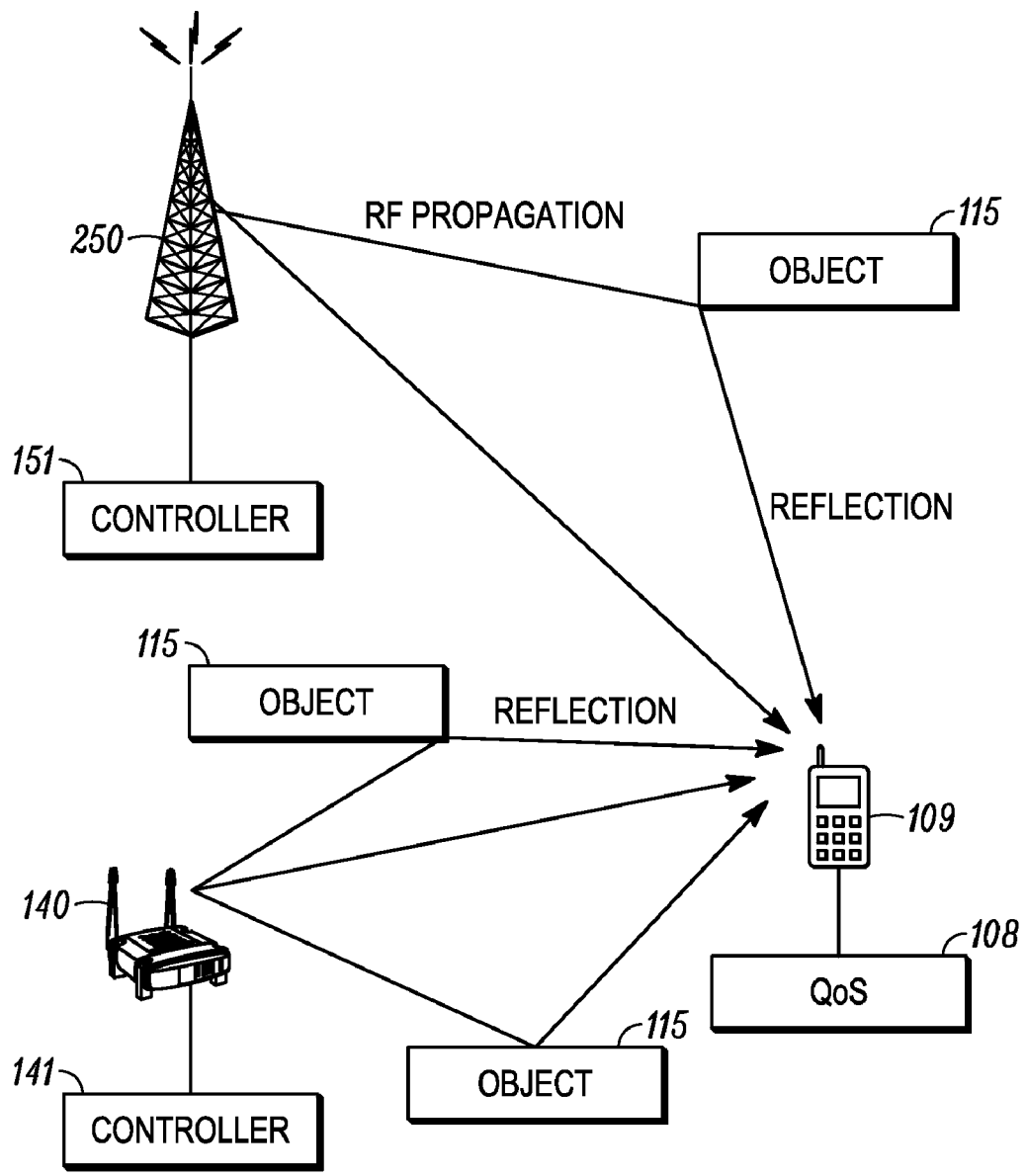
FIG. 5 is a communication system employing ray launching for assessing signal reception quality in accordance with the embodiments of the invention.

Referring to FIG. 5, an exemplary application for ray launching 170 is shown. In particular, ray launching 170 is illustrated within the context of a communication system 200. The communication system 200 can provide wireless connectivity to a mobile device 109 over a radio frequency (RF) communication network or a Wireless Local Area Network (WLAN). For example, the communication system 200 can include a base station 250 operating over a RF link, and/or a wireless router 140 for providing a Wi-Fi link, but is not limited to these. The mobile device 109 can communicate with other base stations or cellular towers (not shown) using a standard communication protocol such as CDMA, GSM, OFDM, or iDEN but is not limited to these. Objects 115 within the environment can affect RF transmission from the base station 250 or the router 140 to the mobile device 109. The objects can cause RF interference that degrades a signal reception quality. Ray launching 170 can be used to assess a reception coverage of the mobile device 109 in the communication system 200.

As an example, the base station 250 can include a controller 151. The controller 151 can assess a reception of RF signals at the mobile device 109 using ray launching. Notably, the base station 250 and the mobile device 109 can be communicatively coupled, thereby allowing the mobile device 109 to inform the base station 250 of ray propagation success, and accordingly signal quality reception. The mobile device 109 can also include a Quality of Service (QoS) module for assessing the reception. As one example, the QoS 108 can present an indicator on the mobile device 109 revealing signal strength or signal integrity. Moreover, the QoS 108 can inform the controller 151 of the signal reception coverage. In view of the signal reception coverage, the controller 151 can increase the number of rays and the direction of the rays sent to the mobile device 109 in accordance with the embodiments of the invention.

As another example, the router 140 can assess a reception coverage of the mobile device 109 through ray launching. The router 140 can include a controller for launching the rays and assessing reception coverage. The controller 141 can identify rays that successfully reach the mobile device 109. The controller 141 can inform the router 140 of the direct transmission paths and reflection paths to the mobile device 109. The router 140 can then optimize a communication with the mobile device 109 based on the path information. In a typical WLAN implementation, the physical layer can use a variety of technologies such as 802.11b or 802.11g Wireless Local Area Network (WLAN) technologies. The physical layer may use infrared, frequency hopping spread spectrum in the 2.4 GHz Band, or direct sequence spread spectrum in the 2.4 GHz Band, or any other suitable communication technology.

Briefly, ray launching may be viewed as an energy transfer mechanism in which the energy interacts with an environment. It is not limited to only modeling RF propagation in a communication system. From this perspective, then, ray launching can be applied in other areas such as the simulation of diffusion in semiconductors, or in the simulation of fiber optic transmissions. From this more general perspective, the ray may have distinct attributes not necessarily related with RF signal descriptors. For example, in the simulation of diffusion in semiconductors, the rays consist of dopant densities, and the interaction medium is the semiconductor material. In this case, the ray actually supports a physical entity that performs energy transfer (energy transmission to the atoms in the semiconductor lattice) as well as modifications to the medium (energy reflection to other atoms). Another suitable application is X-ray crystallography. Ray launching can also be extended to the simulation of diffraction phenomenon in a communication, whereby the rays are emitted from the source and proceed to the sink via diffraction along edges. These edges can be due to over-the-roof diffraction or around-the-side diffraction.

Figure 6:
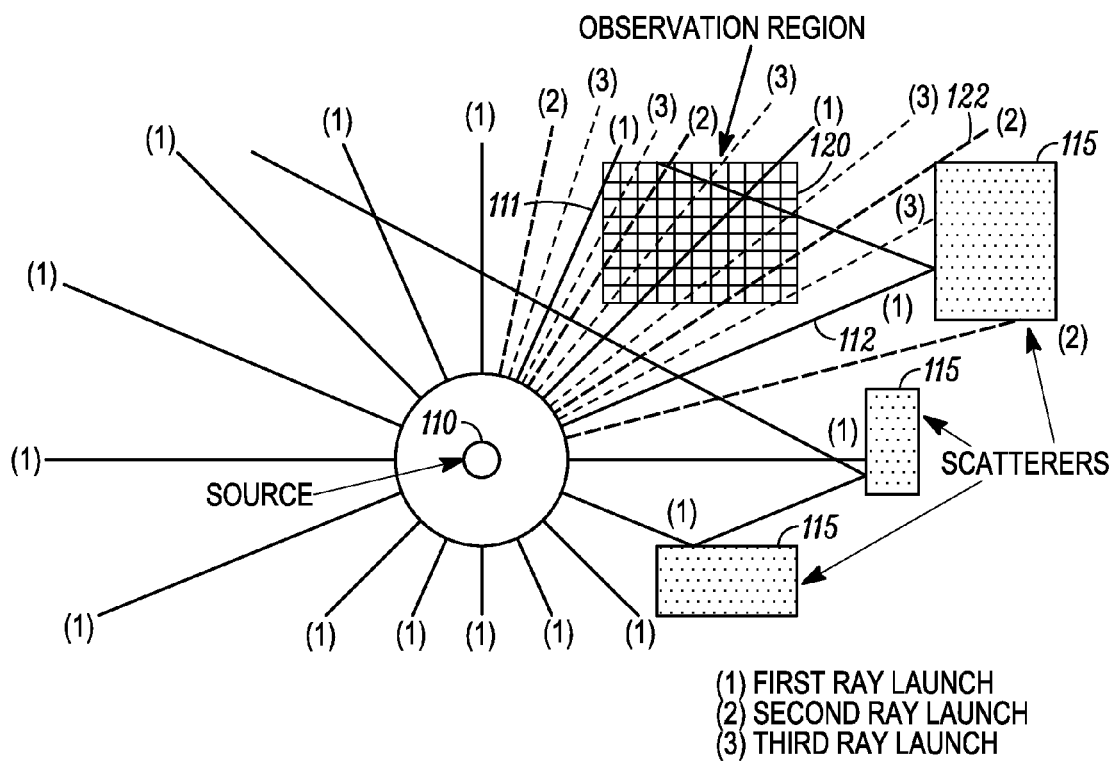
FIG. 6 is an illustration of launching successive rays in accordance with the embodiments of the invention.

Referring to FIG. 6, an illustration of ray launching 170 is shown. In ray launching 170, a point source 110 "radiates" rays 111 in all directions based on a specified angular spacing 131 (See FIG. 4). The angular spacing 131 may be specified in terms of θ (azimuthal) or ø (elevation) independently or jointly. As the ray 111 "propagates" it is subjected to path loss in the medium, so it is necessary to maintain a distance parameter. A distance parameter identifies the distance the ray has traveled during propagation. In addition, a ray 111 may encounter an obstacle in which two events simultaneously occur: transmission and reflection. For example, as illustrated, one of the first launched rays 112 strikes the object 115. The striking of the ray on the object can cause a direct transmission and a reflection. Both the direct transmission and the reflection can proceed to strike the target 120. The illustration of FIG. 6 only shows a reflection ray off the object 115.

The structure of the object causing the reflection can be represented as a facet. The simplest facet structure is a triangle, which consists of three nodes (vertices), three edges, and a single face. With the facet is associated the material properties (permittivity, conductivity, etc.). A ray 112 that encounters such a facet on the object 115 can produce a transmission and a reflection. A transmission ray is a new ray generated as a result of the ray 112 striking the facet. A reflection ray is the ray 112 that reflects off the facet. That is, the single ray 112 can produce a dual event. A normal vector of the facet allows quick evaluation of the transmission and reflection signal levels due to the material properties. A normal vector is a vector that is orthogonal to the single face of the facet.

It should be noted that the material properties of the facet can be used to control transmission and reflection of the ray 112 in the medium. The medium is the space encompassing the point source 110, the objects 115, and the observation point. In the case of RF communication signals, the medium is air. As an example, an object 115 that is a pure electrical conductor (PEC) can reflect all incident energy of the ray 112. That is, the object 115 will not produce transmission rays. Only a phase of the reflected ray is affected. Simulation environments attempt to model the interactions between rays, objects, and targets in an environment. Various methods of modeling the objects can be considered. For example, a half-space method treats the material of the object 115 with inherent material properties that not allow ray transmission. In this case, the object is considered only to reflect a ray. The object is not allowed to introduce transmissions. In practice, the simulation prevents the object from transmitting rays. This half-space condition allows for non-metal reflections while "absorbing" the transmitted energy.

In ray launching 170, a plurality of rays are launched successively in time. For example, a first set of rays denoted by the (1) in FIG. 6 are launched at an initial angle. After the launch, an analysis is conducted to determine the number of successful rays reaching the target. For instance, ray 111 is a direct transmission on the target 120. The target 120 is considered the observation point in the analysis. Ray 112 is also a successful ray since the ray reflects off the object 115 and strikes the target 120. Other rays that do not strike the target are unsuccessful and eliminated from future launch. Upon analysis at the observation point, new rays are spawned for successful rays. At a second time, a second set of rays denoted by the (2) in FIG. 6 are launched based on the success of the rays in the first launch. The process continues, with each set of new launches based on a success of previous launches. In practice, a set of pre-launch rays are created after each launch.

Briefly, ray interaction and transmission/reflection is an assumption that the ray is a physical entity describing only length; ray interaction with a facet consists of a "point" event. It is important now to clarify that there are actually two options for implementing the ray:

1. A ray is modeled as a "ray tube" for the purposes of propagation. This ray tube establishes an area for the wave front and gives the ray a cone shape with associated volume. Ray events are still at the "point" of the ray, but the ray occupies space. This allows for the receivers used to measure signal properties/descriptors to be represented by a single point. All rays containing the receiver point in their volume have therefore contributed to the reception, and their statistics are used to calculate the individual contributions to the signal.

2. A ray is modeled as an entity of length only (i.e., not ray tubes) and interactions with a facet occur at a "point" on the facet. However, if a receiver is treated as a point in space, the likelihood that an actual ray goes through that point is extremely low. In this case, it is necessary to define a volume around the receiver point, typically a sphere with a specified radius. In this case, the rays going through the volume are contributors to the receiver.

Figure 7:
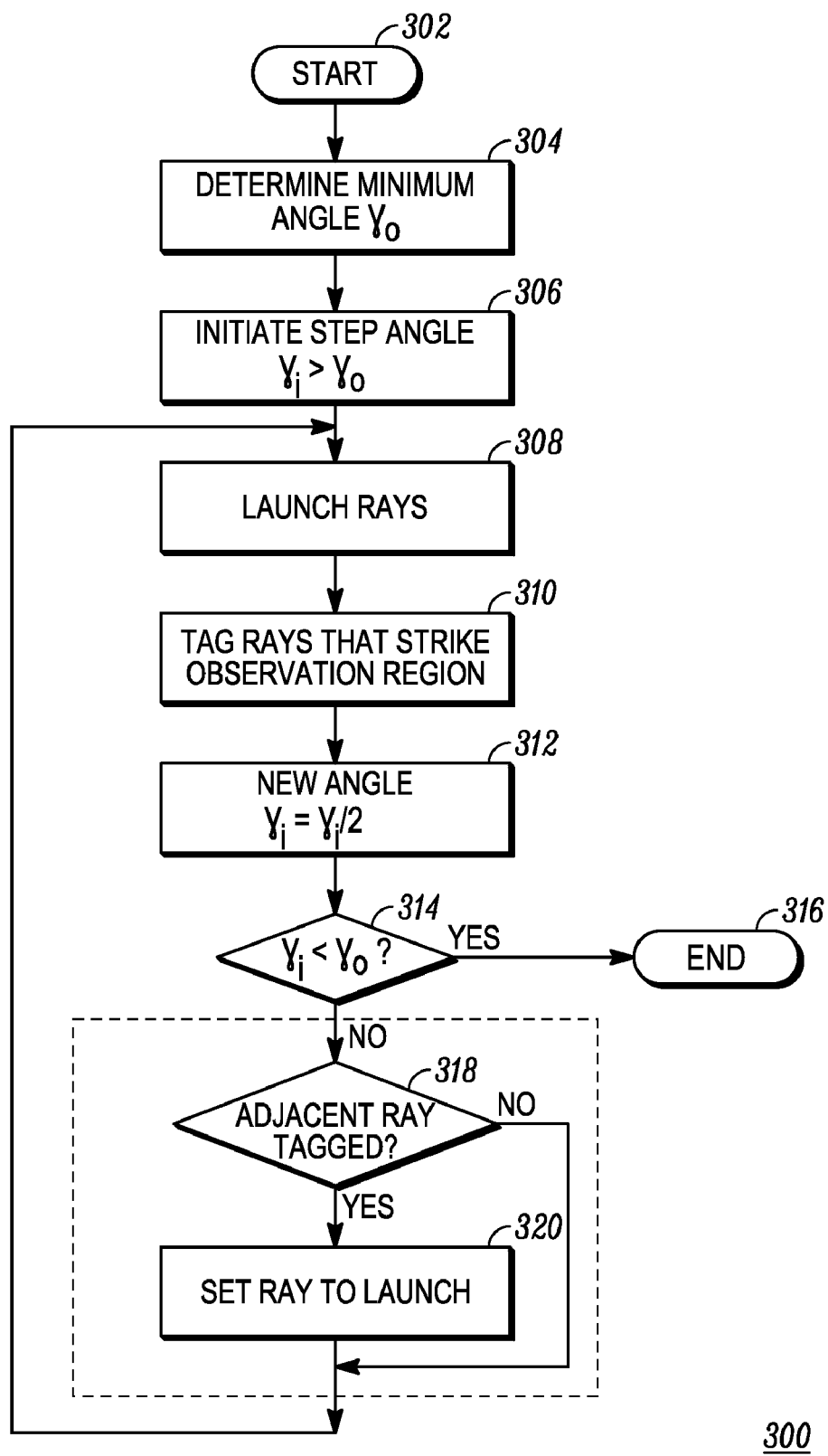
FIG. 7 is a method for ray launching in accordance with the embodiments of the invention.

Referring to FIG. 7, a method 300 for ray launching 170 is shown. The method 300 can be practiced with more or less than the number of steps shown. To describe the method 300, reference will be made to FIGS. 3 and 6. In one embodiment the method 300 can be implemented entirely in hardware or software, such as a DSP, a microprocessor, an Application Specific Integrated Circuit (ASIC), a Field Programmable Gate Array (FPGA), or any other suitable software or hardware. As an example, a controller, such as the controller 141 or controller 151 in FIG. 5, can implement the method 300 for ray tracing. In the foregoing description of the method 300, it should be noted that a controller as described performs the method steps. In addition, the method 300 can contain a greater or a fewer number of steps than those shown in FIG. 7. At step 302, the method 300 can start. The method 300 can start in a state wherein a plurality of rays are prepared to launch. The rays can be directed in a multitude of directions. In practice, for the initial launch, the rays can be uniformly angularly spaced so as to be directed in all directions in the environment. For example, referring to FIG. 3, the source 110 can prepare launch for a plurality of rays in all directions.

At step 304, a minimum angle spacing can be determined. The minimum angle spacing identifies the direction each ray will be launched. The initial angular spacing $\gamma_o$ also corresponds to a number of rays. Notably, each ray will have an associated computational cost, since each ray needs to be traced along a path from the source 110 to an end condition. The minimum angular spacing can correspond to an angular spacing that provides the most efficient allocation of computational resources.

At step 306, an initial step angle can be determined. The step angle $\gamma_i$ determines the spacing between the rays for a successive launch, and accordingly sets the number of rays to launch.

At step 308, the rays can be launched. Rays are launched in a direction corresponding to the current angular spacing $\gamma_o$. Referring to FIG. 6, a first set of rays (1) can be launched in all directions. Some of the rays will strike the target 120 via direct transmission or via reflection off a surface 115.

At step 310, rays that strike the target 120 (e.g. observation region) can be tagged. A tagging identifies a ray as successfully striking a target 120. A tag may contain information identifying the ray, the direction of the ray, the power of the ray, or any other attribute that defines features of the ray. In the most general sense, a tag is an index number identifying the ray among the plurality of rays.

At step 312, a new angle can be created. The angle can be created from the previous launch angle. In one arrangement, the step 312 can halve the initial angle: $\gamma_i = \gamma_i/2$. In such regard, the step 312 can be considered an angular bisecting method. It should be noted that the step 312 is not limited to bisection. The angle can be reduced by other factors, and factors that can include a weighting based on a success of a ray.

At step 314, a determination can be made as to whether the new angle is less than a pre-specified resolution. For example, if the angle is less than the minimum angle, $\gamma_i < \gamma_o$, the method 300 can end. In this case, the angle has been successively reduced beyond a threshold. For example, the minimum angle may correspond to a certain maximum number of computations.

If the angle is above the minimum angle, at step 318, a determination can be made as to where rays adjacent to the new rays are tagged. Notably, the method step 314 introduced new rays at a new angle. New rays that are adjacent to at least one tagged ray are kept for launch at step 320. New rays that are not adjacent to any tagged rays are eliminated. In practice, these rays are bypassed and not set for launch. More specifically, rays in a pre-launch are pruned prior to launch based on the success of their neighbor rays. For example, referring to FIG. 6, rays that are adjacent a tagged ray can be set for launch.

The method 300 can successively continue at step 308 for launching new rays at a reduced angular spacing based on a success of previous rays. The method 300 can terminate when the angular spacing is below a minimum angle, such as at step 314, or some other terminating condition is met.

In summary of the implementation for method 300, the controller 141 (See FIG. 5) begins ray launch at a pre-defined angular spacing between rays. The controller 141 examines the rays that impact the regions to be examined (time observation region) and "tags" the rays. The controller 141 can divide the ray launch angle by 2. Based on the tagged rays, the controller 141 can either launch or delete new rays. In each step of the method 300, the controller 141 divides the angular spacing by a factor of 2 initializes pre-launch lays. The controller 141 then decides which new rays to launch at the ray at the new angle. In one mode, the decision is based upon whether an "adjacent" ray is tagged as having struck the region(s) of interest. The controller 141 can implement a simple rule: If all rays adjacent to the pre-launch ray are not tagged, the ray is not launched. A ray is adjacent if it has a minimal distance to the pre-launch ray. In one aspect, the controller 141 can space the rays with respect to a distance metric, such as a Euclidean distance, though other distance metrics are herein contemplated. The spacing is not limited to a distance metric and can include other measures of evaluating separation.

Figure 8:
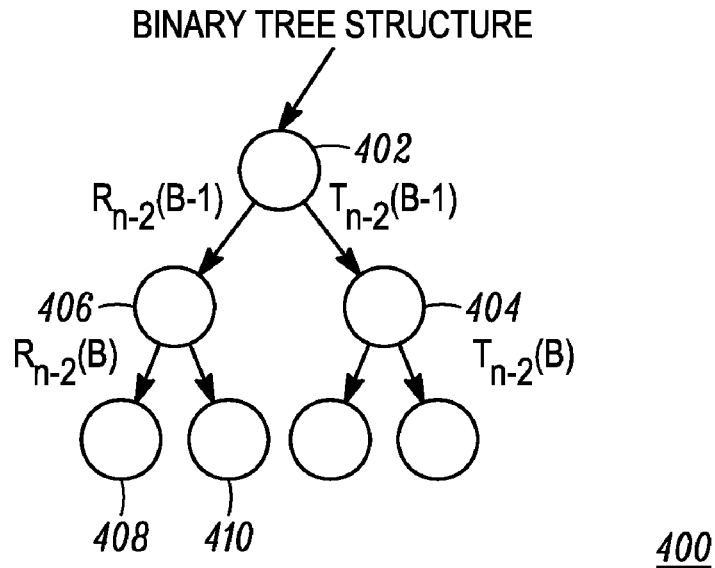
FIG. 8 is a binary tree for assessing reflection and transmission target strikes in accordance with the embodiments of the invention.

As previously described, a ray encountering a facet during propagation generates a transmitted and reflected ray. Accordingly, the controller 141 can generate a "reflection tree" to model the ray propagation. The "reflection tree" can be generated via software for keeping track of successful rays. Referring to FIG. 8, a "binary tree" 400 is shown. The root node 402 in the reflection tree can be a first transmission/reflection event. The controller 141 can generate a binary tree 400 for each ray 111. Notably, the controller 141 keeps track of a ray's transmissions and reflections during propagation to the target 120 using the binary tree 400. The binary tree 400 is an efficient structure for allowing the controller 141 to model a plurality of rays in accordance with method 300. The tree is binary since one branch 404 corresponds to the transmission and the other branch 406 corresponds to the reflection. Each node of a branch 406 can produce another branch having a reflection node 408 or a transmission node 410. It should be noted that the binary tree 400 does not need not be balanced. The structure and the depth of the tree can also be set by termination conditions.

It should be noted that the controller 141 reduces the number of rays launched to reduce the number of computations in the method 300. This will eliminate any computations associated with deleted rays, and allow for the inclusion of additional parameters in the ray calculations. Furthermore, by eliminating those rays that do not contribute to the results prior to launching, the controller 141 can dedicate computational effort to greater resolution in the regions with successful ray impact.

Figure 9:
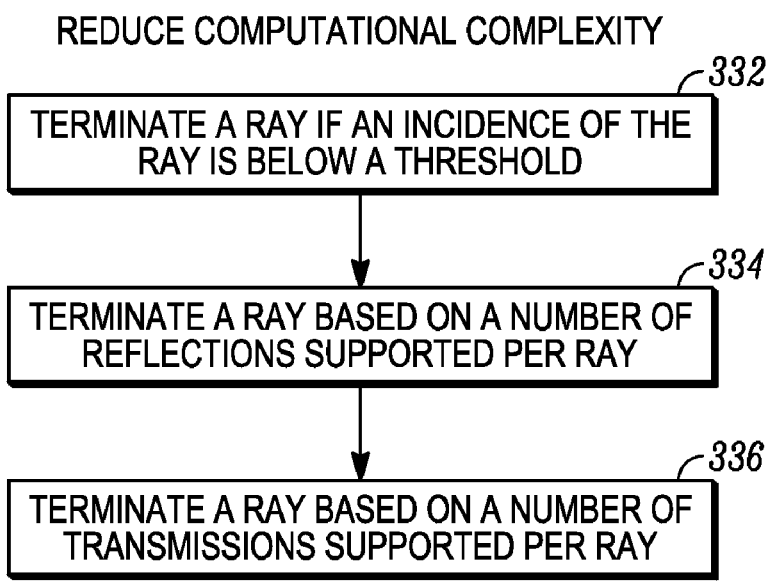
FIG. 9 is a set of methods for terminating a ray in accordance with the embodiments of the invention.

Referring to FIG. 9, an exemplary set of terminating conditions for the binary tree 400 is presented. The set of terminating conditions identifies criteria that terminate ray propagation. Notably, the controller 141 can implement the set of terminating conditions. In practice, a ray that is terminated is no longer followed; i.e. traced. For example, in simulating RF propagation signals, rays that are terminated by the controller 141 are no longer considered for direct transmission or reflective transmission on a target. That is, a contribution of the ray is no longer considered once the ray is terminated. By terminating rays, the controller 141 reduces a computational load of the analysis. Moreover, the controller 141 can prune the signal propagation analysis for non-successful rays and concentrate computational resources on only those rays that strike a target, or that contribute to the strike due to reflection.

In case 332, a ray can be terminated if the signal level of the ray detected at the target is below a threshold. In practice the controller 141 can terminate a tracing of the ray upon recognizing the condition. This condition may be met due to the number of reflections ($N_{11}$) or number of transmissions ($N_1$) required to reach the threshold. In this case, the number of levels B is $B=\max(N_{11},N_1)$.

In case 334, a ray can be terminated based on a number of reflections supported per ray. In practice the controller 141 can terminate a tracing of the ray upon recognizing the condition. For example, only a limited number of reflections will be considered for each ray. If a ray arriving at the target is a result of more than a predetermined number of reflections, the ray is eliminated. In this case, referring to FIG. 8, barring any branches eliminated from the PEC or half-space conditions, a fully symmetric tree is built. In effect, this can assure that the tree 400 is at least $B=N_{11}$ or $B=N_1$ levels deep, with each branch supporting transmission and reflection. The binary tree 400 of FIG. 8 demonstrates a fully symmetric tree.

Figure 10:
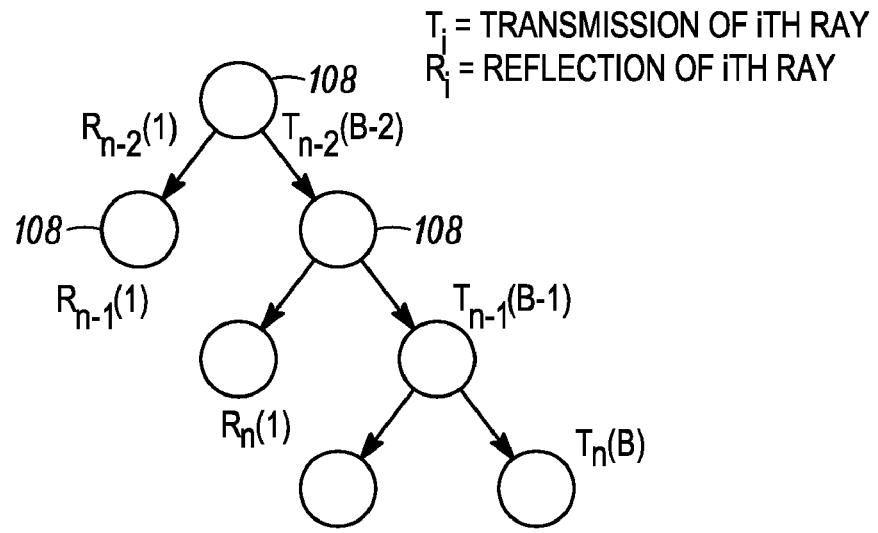
FIG. 10 is an asymmetric binary tree for assessing reflection and transmission target strikes in accordance with the embodiments of the invention.

In case 336, a ray can be terminated based on a number of transmissions supported per ray. In practice the controller 141 can terminate a tracing of the ray upon recognizing the condition. A ray can also be terminated based on a combination of level, number of reflections, and/or number of transmissions (cases 332-336). This is a means of biasing the ray launch towards supporting more reflections (for example, for an outdoor environment), or more transmissions (for an indoor environment). In this case, for each transmission (reflection) m reflections (transmissions) are branched off. An example of a transmission-biased tree with single spawned reflected ray m=1 is shown in FIG. 10

For each ray, therefore, the maximum number of nodes N in the tree is $$N = \sum_{n=0}^{\max(N_R,N_T)} 2^n$$

If K computations are associated with each ray event, then the total number of computations is KN. This serves as an important computational bound when considering pre-computation.

In one aspect, the success of method 300 depends on the initial angular spacing. Accordingly, the controller 141 can choose the initial angular to be sufficiently "dense" to guarantee at least one ray strikes the target 120 (e.g., observation region). If the controller 141 fails in a first attempt at obtaining a tagged ray (for example, in the case of a small observation region and large initial angular spacings), then the controller 141 may be necessary to proceed with angular bisection until a tagged ray is obtained. To improve computational efficiency and speed of search, the angular spacing may be $2^N$ (2, 4, 8 or 16°) so that division by 2 corresponds to an accumulator shift operation. However, this is not a prerequisite for the usefulness of the technique, especially given the fact that rays can be launched over a span of 360° and do not lend themselves to powers of 2 beyond 8°. The main drawback of not considering powers of 2 is that subsequent divisions may result in angular spacings that are not whole numbers and therefore not easily interpreted.

Figure 11:
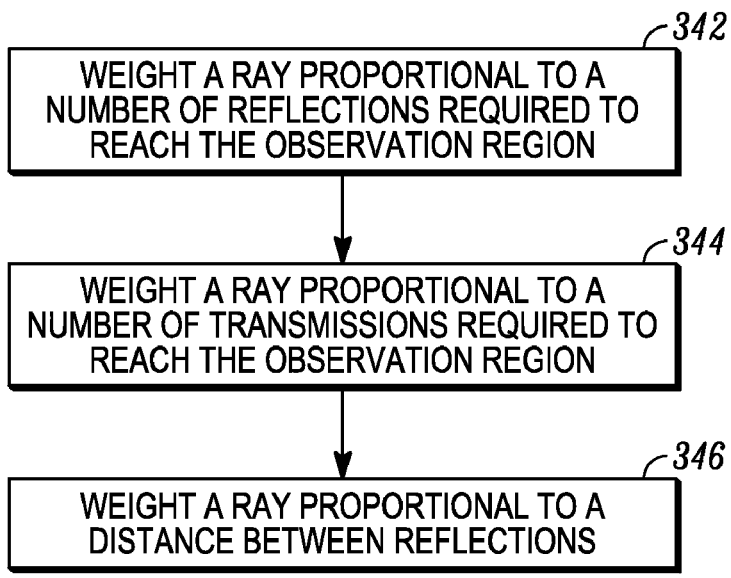
FIG. 11 is a set of methods for weighting a ray in accordance with the embodiments of the invention.

Referring to FIG. 11, a set of methods 340 for increasing a computational speed of the method 300 is shown. Again, the controller 141 can implement the methods 340 for increasing computational speed. Notably, the methods 340 can be practiced individually or in combination, and are not limited to those shown. Briefly, the controller 141 can increase a computational efficiency by weighting rays. During computation, the controller 141 can assign a "weight" based on some criterion. For example, the controller 141 can adjust the angular spacing in accordance with the weight. Accordingly, the controller 141 can proceed with a finer angular spacing 1/p with p>2 in the direction of a strongest-weighted ray. During operation, the controller 141 can impose various criteria to weight a ray based on its interaction with the geometry of the environment:

In practice the controller 141 can weight a ray based on method steps 342-346. In method step 342, a ray can be weighted in proportion to the number of reflections required to reach the target receiver. Notably, ray propagation is extremely sensitive to ray incidence angle, especially over long distances. In method step 344, a ray can be weighted in proportion to the number of transmissions required to reach the target receiver. This can be useful for modeling signal propagation in indoor environments. In method step 346, a ray can be weighted based on a measure relating to distances. For example, weight the ray based on the longest distance between reflections. The ray can also be weighted in proportion to a defined combination of transmissions and reflections required to reach the target receiver as described in methods 342-344.

Figure 12:
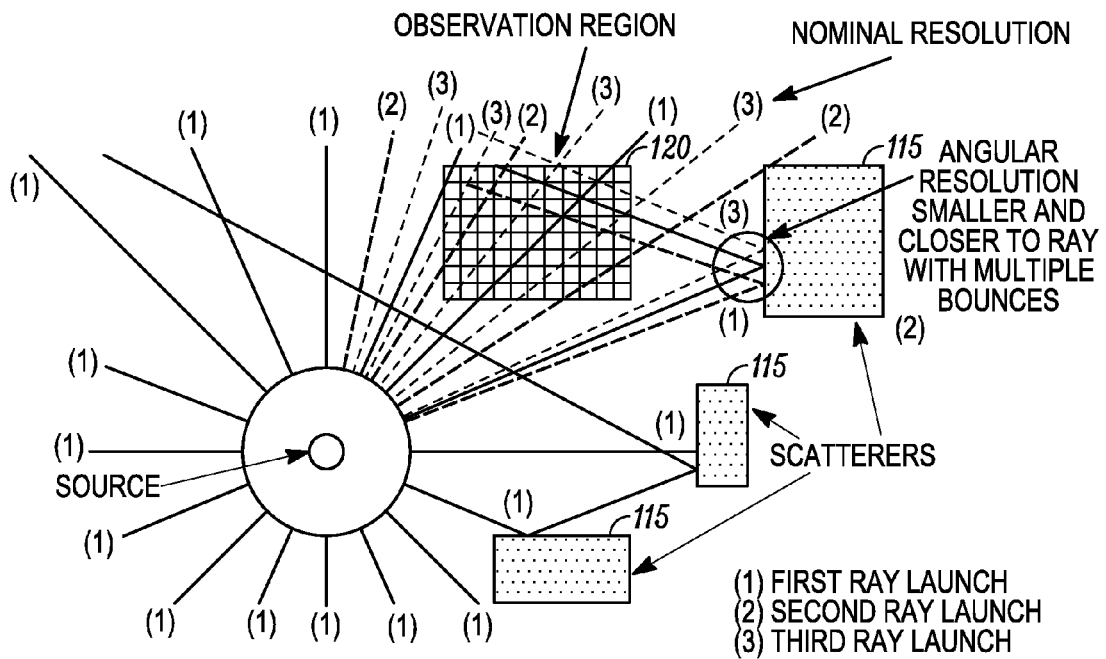
FIG. 12 is a set of methods for launching successive weighted rays in accordance with the embodiments of the invention.
Figure 13:
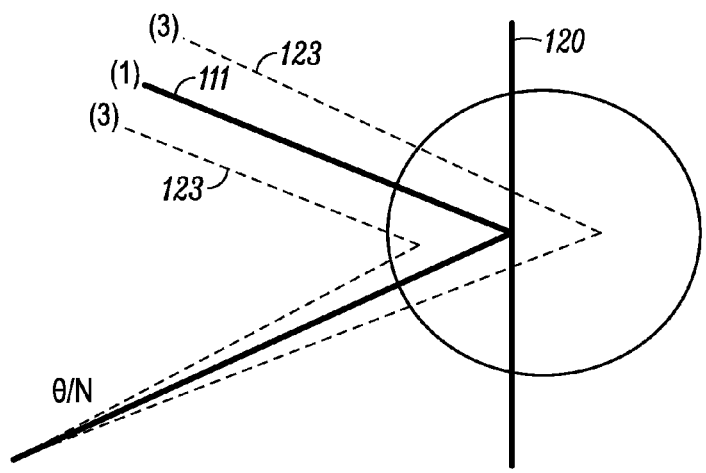
FIG. 13 is a magnified portion of FIG. 12 illustrating a weighted angle in accordance with the embodiments of the invention.

Referring to FIG. 12, a didactive illustration of the methods steps 342-344 for ray launching is shown. In such regard, the method 300 of ray launching can be considered adaptive ray launching. Notably, the method 300 of ray launching 170 shown in FIG. 6 is complemented with the method of ray weighting shown in FIG. 11. In particular, a first ray launch results in a successful strike which results in the addition of two new rays in close proximity of the first ray launch. A more detailed view of the first ray launch is shown in FIG. 13. The pre-launch rays 123 for the third ray launch has a closer angular spacing to the strongly weighted ray 111. Notably, the steps of method 300 still apply during weighting. The only modification is in the angular spacing to take advantage of the fact that rays with greater weight have succeeded in striking the target receiver to a greater degree than other simpler interaction mechanisms.

The number of reflections of a ray are important for propagation simulation results. In one aspect, a large number of reflections and transmissions can allow for sufficient energy to be captured in the area(s) of interest of a complex scattering environment. However, too many reflections and transmissions can result in excessive data and simulation time. Method 300 of adaptive ray launch technique can alleviate the initial computational load by tracking the most successful rays that strike the target region.

Figure 14:
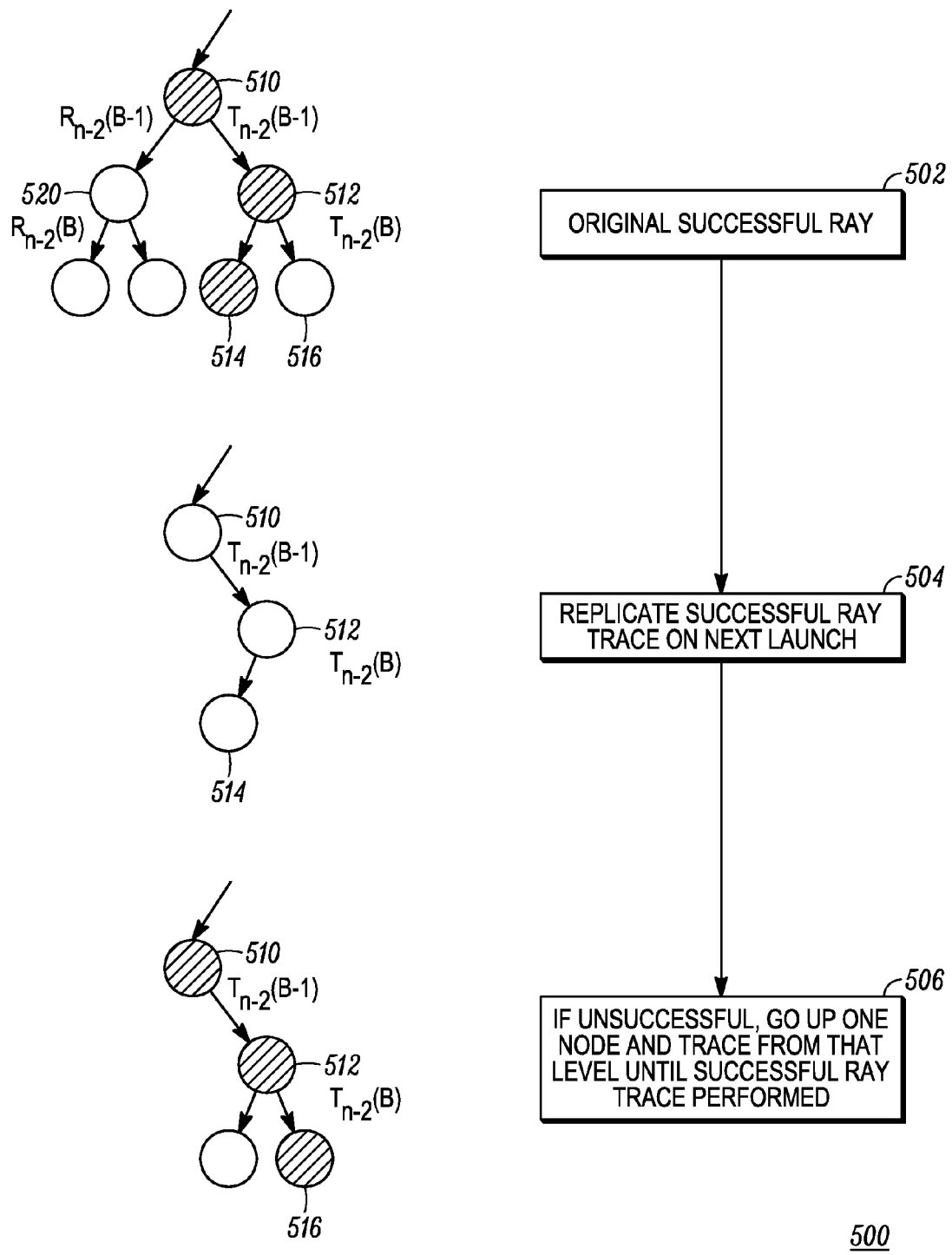
FIG. 14 is an illustration and flowchart for backtracking through a binary tree in accordance with the embodiments of the invention.

Referring to FIG. 14, a modification to the binary tree 400 of FIG. 8 is shown. A set of method steps 502-506 are also shown for describing the generation of nodes on the binary tree 400. Briefly, the modification can also yield good results in subsequent ray launches. Again, the controller 141 can generate the binary tree 400 in software for keeping track of successful ray propagations. The controller 141 can practice the method steps 502-506. At step 502, a selection of nodes (510-512-514) corresponding to the original successful ray are presented. To do this, the actual ray path is traced to the successful end-node 514, as illustrated. At step 504, a successful ray trace can be replicated on a next launch. In practice, the smaller angle (due to the higher weighted ray) is used and now the same path (510-512-514) is traced, discarding the other node 516 associated with the corresponding events, as illustrated. At step 506, if the path (510-512-514) was unsuccessful, the tree is traced back to the next higher node (512). The next ray tracing operation is then performed at this node 512. If unsuccessful again, the next higher node (510) is utilized and the process is repeated until successful or the root node is reached.

It should be noted that the method steps 502-506 can be applied to method 300. That is, the controller 141 can implement the method steps to increase a computational performance. Accordingly, the method 300, including methods 340 of adaptive weighting, and methods 500 for increasing speed of search in the binary tree 400, are dependent on the initial ray launch interval. If the rays are too dispersed, it is possible that none of the rays will strike a target region. The method 300 prescribes that another ray launch be performed at the new angular spacing and the process continues until at least one ray is successful. In such regard, computational resources associated with carrying out the method 300 may consume as much computation as the method without adaptation.

In one regard, the method 300 can further include adding a "bias" to the adaptive ray launching to minimize excess use of computational resources. This can be done by performing some pre-calculations of the environment and simulation conditions prior to any ray launch. Some examples of such pre-calculations include, but are not limited to:

1. Pre-calculate LOS (line-of-sight) paths from ray source to receiver points in area(s) of interest. From this, several options are available:

a. If LOS exists, determine required angle for ray launch and set prior to launch.

b. If no LOS exists, consider the number of transmissions necessary to reach the area(s) of interest. Set number of transmissions supported to this value and perform ray launch.

c. If no LOS exists, determine if any obstacle interfaces have material properties that prohibit ray transmission. For this obstacle, determine the angular region of the ray launch sphere that is impacted and disable ray transmission for all the rays in that portion of the sphere to the number determined in the pre-calculation. (For example, for a given LOS path it takes two transmissions to strike a metallic object. The geometry of the metallic object can be used to determine the total "blockage" back at the ray source. All the rays that would have impacted this object will have a maximum of two transmissions supported.)

2. Biasing of the adaptive ray launch based on the density of scatterers around the ray source and/or around the receiver area(s) of interest. This may consist of determining the number of objects within a prescribed distance of the points of interest and modifying the number of ray reflections or transmissions appropriately.

3. Biasing of the adaptive ray launch based on the proximity of scatterers around the ray source and/or around the receiver area(s) of interest.

As already noted in the discussion of FIG. 9, the number of transmissions and reflections are important for propagation simulation results. Too few of any one of these parameters may result in insufficient energy captured in the receiver area of interest, leading to inaccurate results. Too many of any one of these parameters increases the computational load. Accordingly, the method 300 can be optimized with respect to the reflections/transmissions supported in addition to the ray launch.

Moreover, indoor and outdoor environments may call for different reflections/transmissions settings depending on the location of the receiver area. If the receiver area is outdoors and there is no interest on indoor coverage, the obstacle facets can be set to the half-space construct and the number of reflections should be set higher than the number of transmissions. For indoor coverage, the number of transmissions may need to be higher in order to penetrate through the obstacles to reach an internal receiver area. This can be set by the user through an appropriate interface, but this does not constitute adaptive reflection and/or transmission setting as considered here.

In such regard, the method 300 can further treat each launched ray separately. The method 300 can be initiated through the adaptive ray launch described in method 340 of FIG. 9. The method 300 for treating each ray separately can also include pre-calculation as previously described. The method is briefly discussed in the foregoing.

Consider a single ray that enters the coverage region and therefore contributes to the results. This ray may have reached the coverage region by way of transmission (T) or reflection (R) (See Binary Tree 400 FIG. 8). Depending on the type of event (T or R) for that ray, the number of transmissions or reflections can be increased depending on some set of criteria. The criteria may be related to the type of simulation (indoor or outdoor) or with relation to some measure of interest. Thus adaptive R/T setting occurs for each "successful" ray only. In order to bound the R/T settings, the method 300 can impose a terminating condition. One termination condition imposes the adaptive reflection/transmission settings (See FIG. 11) based on a criterion that time results statistics do not vary significantly. An example of this type of terminating condition would be the setting of supported reflections and/or transmissions for that particular ray until the received power does not vary by such user-defined bound. Another terminating condition may be based on the comparison of relative signal levels between the original successful ray (i.e., the ray that reached the target receiver region) and any of the spawned reflected/transmitted waves based on time adaptive R/T technique.

Time adaptive R/T technique may invariably result in an increase in the size of the binary reflection tree 400 (See FIG. 8), but only along the nodes of the successful rays. In one aspect, the number of calculations required to support the technique can be reduced by comparing the relative signal levels, instead of measuring the actual levels for each ray. As an example, the following measure can be employed:

$$\delta = \frac{\text{direct path length}}{\text{reflected path length}}$$

where "direct path length" is the original successful ray's path length from the previous event (reflection or transmission), and "reflected path length" is the path length of any one of the reflected rays spawned from the original successful ray. The measure above gives $\delta=1$ when the contribution of the original amid reflected rays are similar. On the other hand, $\delta \rightarrow 0$ as the reflected path length increases, and if it goes beyond a certain threshold (set through $\delta$) that ray is ignored as it will not contribute significantly to the results. The Time adaptive R/T technique is a complementary technique to the adaptive ray launching method proposed herein. When combined with adaptive ray launching, adaptive R/T setting can result in higher accuracy with superior computational efficiency for propagation simulations based on the ray launching method. Ray launching can also be extended to diffraction rays where the binary tree consists of paths resorting to over-the-roof or around-the-side diffraction. Diffraction rays can be generated in response to reflection rays that are incident on a sink.

Figure 15:
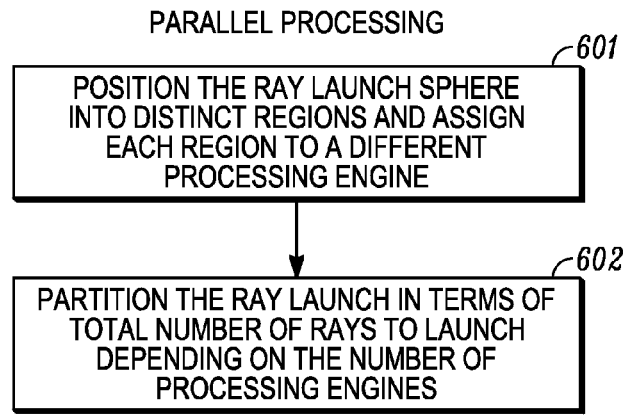
FIG. 15 is a set of methods for using multiple computation engines in accordance with the embodiments of the invention.

Referring to FIG. 15, a set of methods for performing ray launching 170 using parallel processing is shown. As each ray is an entity of its own, it is possible to parallelize the technique in several different ways. As shown in step 601, the ray launch sphere can be partitioned into distinct regions or quadrants and assign each quadrant to a different processing engine. The ray launch sphere can be any object for applications in which the ray launch does not proceed from a point source Step 601 is straightforward, but has the limitation that some quadrants may have few rays to operate with while others may have too many. A means of reducing the overhead of specific quadrants is to repartition the sphere excluding the regions with no ray launches. This allows for adaptive partitioning. As shown in step 602, the ray launch can be partitioned in terms of total number of rays to be launched, the partition de-pending on the total number of distinct processing engines. In this case, the partitioning is dependent upon the ray launch density, and the intent is to assign the same density to each processing engine.

Figure 16:
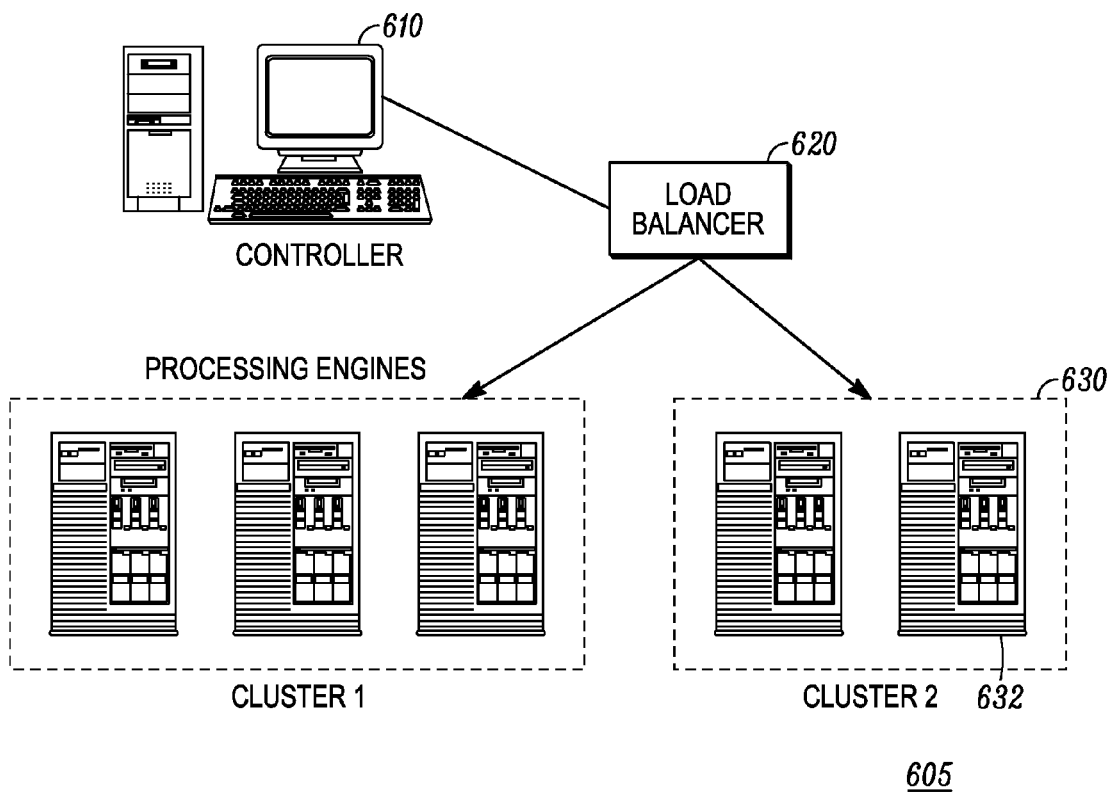
FIG. 16 is a computation system for implementing the technique in accordance with the embodiments of the invention.

Referring to FIG. 16, an exemplary parallel architecture system 605 is shown. The system 605 can include a centralized server 610, a load balancer 620, and one or more clusters 630. Each cluster can include a processing engine 632 to perform one aspect of the ray launching computation. The term "processing engine" considered above can refer to a distinct processor or to a cluster processors that are networked. The system 605 can be distributed over a network, distributed over a multi-core processing unit, or distributed over any multi-unit processing system. Notably, the parallel operations are not restricted to large scale operation as shown in FIG. 15. The system 605 of FIG. 15 can also be considered an architecture for a single integrated circuit, or an embedded system. For example, each of the processing engines 632 can be different processing cores on a printed circuit board. In such regard, the centralized server 610 can be the controller 141 for delegating processing tasks for off chip components.

The methods steps 601 and 602 parallelize the adaptive ray launch method 300. An alternative approach to parallelize the method 300 is to consider time adaptive reflection/transmission (R/T) method as well. In this case, when a ray is launched and a R/T event occurs, the continuation of that ray launch is taken over by a new processing engine. This frees up the previous processing engine to consider a new ray launch or to handle another R/T even from another processor. To exploit the opportunities afforded by many processing engines 632, it may be feasible to partition the problem such that the adaptive ray launch is parallelized in a defined set of processing engines while the adaptive R/T method is parallelized in the other set.

In summary a method 300 for reducing the number of computations in a ray-launching propagation system 170 has been provided. The method 300 consists of initiating the ray launch with a certain angular spacing and then continuing to reduce the angular spacing by a pre-determined factor and launching rays based on a simple rule. An enhancement to the method allows for the angular spacing to be varied depending on the weight assigned to adjacent rays. This approach takes advantage of the fact that multiple reflected rays tend to be more sensitive to angular deviations, hence a smaller angular resolution is needed. Rays with lower weights proceed at the nominal angular spacing. To further improve the technique with weighted rays, a successful ray path is traced and then replicated in the weighted ray to minimize memory usage and computations.

The method 300 has also been shown capable of supporting pre-calculation of the environment to bias the adaptive ray launch technique for greater chances at successful ray launches. It was noted that pre-calculation can add significantly to the computational load so a measure was derived for bounding the pre-calculation load based on the initial conditions of the simulation (ray density and supported reflections).

In another embodiment, the method 300 was complemented with adaptive reflection/transmission to address time variability of the geometries treated by the ray-launch method. It was proposed to bias the ray launch technique to treat the distinct environments independently while increasing the accuracy of the simulation through concentrated ray transmission and reflections in the areas of interest. This embodiment can be important to distinguish simulation in outdoor and indoor environments.

A parallelization system 605 of the method on multiple processing engines was provided. In such regard, both adaptive ray launching as well as adaptive reflection/transmission can benefit from parallelization. Several techniques were discussed and it was alluded that the techniques may be combined to maximize the throughput of the simulator on multiple processing engines.

In closing, several methods for improving the computational efficiency of the ray-launch technique have been provided. The adaptive ray-launch amid adaptive reflection/transmission techniques search for conditions which improve the chances of success above the standard ray-launch technique. Furthermore, it is possible to concentrate the computational effort in the regions of interest and to the level of accuracy desired. The techniques can be readily parallelized through an appropriate partitioning of the ray launch or the ray events in a scattering environment. Furthermore, the principles described herein can be applied to the ray launch as applied to diffraction events around edges of a facet.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A method for ray launching, comprising:
at a source, launching a plurality of rays in the environment, wherein the launching includes weighting a ray proportional to a number of reflections required to reach an observation region, weighting a ray proportional to a number of transmissions required to reach the observation region, weighting a ray proportional to a distance between reflections, or weighting a ray proportional to a distance between transmissions;
evaluating an incidence of transmission rays and reflection rays on the observation region;
tagging rays from the plurality of rays that successfully strike the observation region directly, via reflection, via transmission, or via combinations thereof, or via any set of pre-defined energy changing events; and
selectively adjusting a successive launching in view of the tagging and the incidence.

2. The method of claim 1, further comprising:
estimating a ray propagation from the source to the observation region; and
determining a ray reception quality at the observation region from a signal propagation or energy propagation.

3. The method of claim 1, wherein the step of launching a plurality of rays further comprises:
on a pre-launch, establishing an angular spacing for launching the plurality of rays; and
reducing the angular spacing for successive launches based on the incidence.

4. The method of claim 1, wherein the step of selectively adjusting a successive launching includes:
eliminating at least a ray that is not tagged;
bi-secting an angular spacing for launching rays that are tagged; and
preparing pre-launch rays for launch at the bi-sected angular spacing.

5. The method of claim 1, wherein the step of selectively adjusting a successive launching further includes:
eliminating pre-launch rays that are less than a pre-determined angle.

6. The method of claim 1, wherein the step of selectively adjusting a successive launching includes terminating a ray propagation if an incidence of the ray is below a threshold.

7. The method of claim 1, wherein the step of selectively adjusting a successive launching includes terminating a ray propagation based on a number of reflections supported per ray.

8. The method of claim 1, wherein the step of selectively adjusting a successive launching includes terminating a ray propagation based on a number of transmissions supported per ray.

9. The method of claim 1, wherein the step of selectively adjusting a successive launching includes terminating a ray propagation based on a number of diffractions supported per ray.

10. The method of claim 1, wherein the step of selectively adjusting a successive launching includes terminating a ray propagation based on a quantification of energy events supported per ray.

11. The method of claim 1, wherein the step of evaluating an incidence further comprises:
receiving, from the observation region, an indication of a successful reception of the transmission rays and the reflection rays on the observation region.

12. The method of claim 3, wherein the step of selectively adjusting a successive launching further includes:
eliminating pre-launch rays that have no tagged neighbors.

13. A system for estimating signal propagation in a communication channel, comprising:
a transmitter for successively launching a plurality of rays in an environment having reflection objects and for tagging rays that successfully strike a receiver directly, via reflection, via transmission, or via combinations thereof, or via any set of pre-defined energy changing events;
the receiver in the environment for receiving transmission rays from the transmitter and reflection rays from the reflection objects,
wherein launching a plurality of rays in the environment includes weighting a ray proportional to a number of reflections required to reach an observation region, weighting a ray proportional to a number of transmissions required to reach the observation region, weighting a ray proportional to a distance between reflections, or weighting a ray proportional to a distance between transmissions.

14. The system of claim 13, wherein the transmitter includes a controller for
   determining an angular spacing for launching the plurality of rays; and
   selectively adjusting the angular spacing for successive launches to focus an energy of transmission rays and reflection rays on the receiver.

15. The system of claim 13, wherein the receiver includes a quality of service module for
   evaluating an incidence of transmission rays, reflection rays at the receiver;
   estimating a signal propagation from the transmitter to the receiver from the incidence; and
   determining a signal reception quality from the signal propagation or energy propagation.

16. A method for simulating Radio Frequency propagation in a communication channel, comprising:
   at a source, launching a plurality of rays in an environment, wherein the launching further comprises weighting a ray proportional to a number of reflections required to reach an observation region, weighting a ray proportional to a number of transmissions required to reach the observation region, weighting a ray proportional to a distance between reflections, or weighting a ray proportional to a distance between transmissions;
   monitoring an incidence of the plurality of rays at the observation region; and
   selectively adjusting the launching in view of the incidence.

17. The method of claim 16, wherein the monitoring includes:
   creating a binary reflection tree consisting of transmission nodes and reflection nodes for determining whether a transmission is received or a reflection is received; and
   pruning nodes in the binary reflection tree that do not contribute to the incidence, wherein the pruning eliminates rays that do not generate a transmission or a reflection on the observation region.

18. The method of claim 16, further comprising:
   partitioning the source into distinct ray launching regions; and
   assigning each section to a different processing engine for parallel processing.

* * * * *